Figure 1:
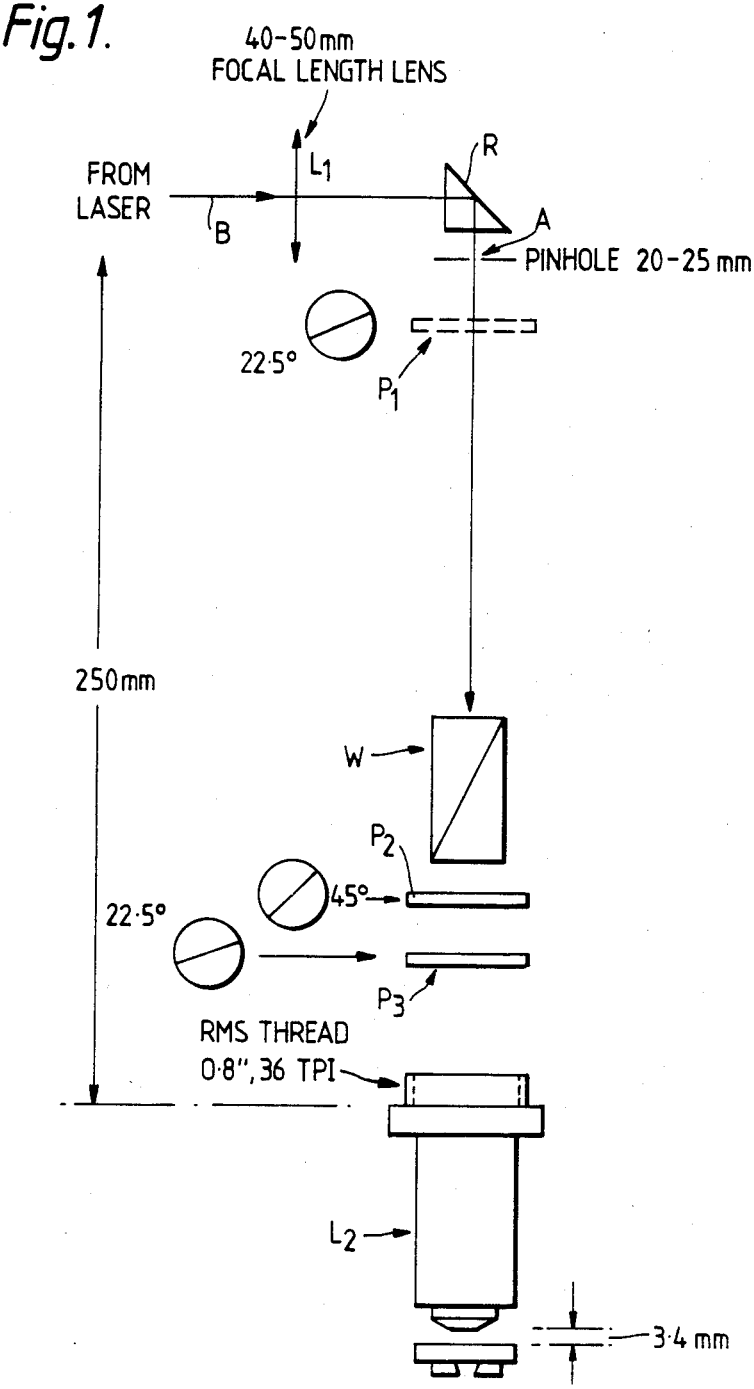

United States Patent [19]

Gardner et al.

[11] Patent Number: 4,802,736
[45] Date of Patent: Feb. 7, 1989

[54] INTERFEROMETERS

[75] Inventors: Keith Gardner, Foxton; Robert J. Longman, Coton; Robert M. Pettigrew, Foxton; Walter T. Welford, London, all of United Kingdom

[73] Assignee: Plasmon Data Systems, N.V., Curaco, Netherlands Antilles

[21] Appl. No.: 925,806

[22] PCT Filed: Feb. 25, 1986

[86] PCT No.: PCT/GB86/00101
§ 371 Date: Dec. 11, 1986
§ 102(e) Date: Dec. 11, 1986

[87] PCT Pub. No.: WO86/04997
PCT Pub. Date: Aug. 28, 1986

[30] Foreign Application Priority Data

Feb. 25, 1985 [GB] United Kingdom .................. 8504772
Jul. 10, 1985 [GB] United Kingdom .................. 8517428

[51] Int. Cl.⁴ ............................................. G02B 27/00
[52] U.S. Cl. ..................................... 350/163; 350/509; 350/510
[58] Field of Search ............... 350/510, 509, 402, 404, 350/163; 356/351; 369/284

[56] References Cited

U.S. PATENT DOCUMENTS 2,601,175 6/1952 Smith ................................... 350/510

FOREIGN PATENT DOCUMENTS 1373011 11/1974 United Kingdom .

OTHER PUBLICATIONS

IBM Technical Disclosure Bulletin, vol. 26, No. 6, Nov. 1983, H. Werlich et al.: "Holographically Generated High Resolution Track Servo Pattern", pp. 2951-2952, see the whole article.
Optica Acta, vol. 12, No. 2, Apr. 1965, London, (GB).
Applied Optics, vol. 19, No. 21, 1 Nov. 1980, E. Leith et al.: "Interferometric Construction of Circular Gratings", pp. 3626-3630.

Primary Examiner—John K. Corbin
Assistant Examiner—Jay Ryan
Attorney, Agent, or Firm—Poms, Smith, Lande & Rose

[57] ABSTRACT

An interferometer which comprises: (1) a single, coherent light source; (2) a first converging lens positioned on the optical axis of said coherent light source; (3) a beam-splitting arrangement positioned on said optical axis and spaced from said first converging lens by a distance greater than the focal length of said lens; (4) a second converging lens positioned on said lens; (4) a second converging lens positioned on said optical axis to receive and to focus the two beams emanating in use from the beam-splitting arrangement; and (5) a mirror arrangement positioned so that the beams focussed by said second converging lens impinge on the mirror system and so that the reflected beams are brought to intersect at a focal point and with a large angle between the principal rays of the two beams.

12 Claims, 2 Drawing Sheets

INTERFEROMETERS

This invention relates to interferometers and in particular to interferometers for use in generating closely spaced interference fringes focussed accurately on an object, typically a glass disk carrying a thin layer of a photoresist.

Optical data storage systems are known which use, as the storage member, a disk carrying a radiation-sensitive layer which has a regular textured surface pattern, for example in the form of a plurality of grooves or an array of protuberances. Optical data storage disks of this type are described, for example, in European patent publication No. 0107379. The required dimensions of the textured surface pattern in this and similar optical data storage disks are on a minute scale and hence problems may be experienced in generating a master from which such optical data storage disks may be replicated.

It is known to expose a photoresist to an interference pattern in light of a wavelength to which the photoresist is sensitive. It is very difficult, however, to generate an interference pattern the fringes of which are concentric circles and are spaced apart by one micron or less.

According to the present invention, there is provided an interferometer which comprises: (1) a single, coherent light source; (2) a first converging lens positioned on the optical axis of said coherent light source; (3) a beam-splitting arrangement positioned on said optical axis and spaced from said first converging lens by a distance greater than the focal length of said lens; (4) a second converging lens positioned on said optical axis to receive and to focus the two beams emanating in use from the beam-splitting arrangement; and (5) a mirror arrangement positioned so that the beams focussed by said second converging lens impinge on the mirror system and so that the reflected beams are brought to intersect at a focal point and with a large angle between the principal rays of the two beams.

Preferably, the beam-splitting arrangement comprises a Wollaston double image prism followed by a polarising arrangement. The coherent light source is conveniently a laser generating light of wavelength about 450 nm or less. The first converging lens preferably has a focal length of about 40–50 mm and the second converging lens can conveniently be a microscope objective. For example, if a laser beam of wavelength 450 nm is focussed by a microscope objective of numerical aperture 0.25, the width of the beam at half intensity will be about 900 nm and if the beam splitting arrangement and mirror arrangement cause two such beams to intersect at 90°, they will form at the focal point straight fringes with a spacing of about 300 nm. It is preferable for the angle of intersection of the two beams to be at least 45°, and more preferably at least 90°.

Figure 2:
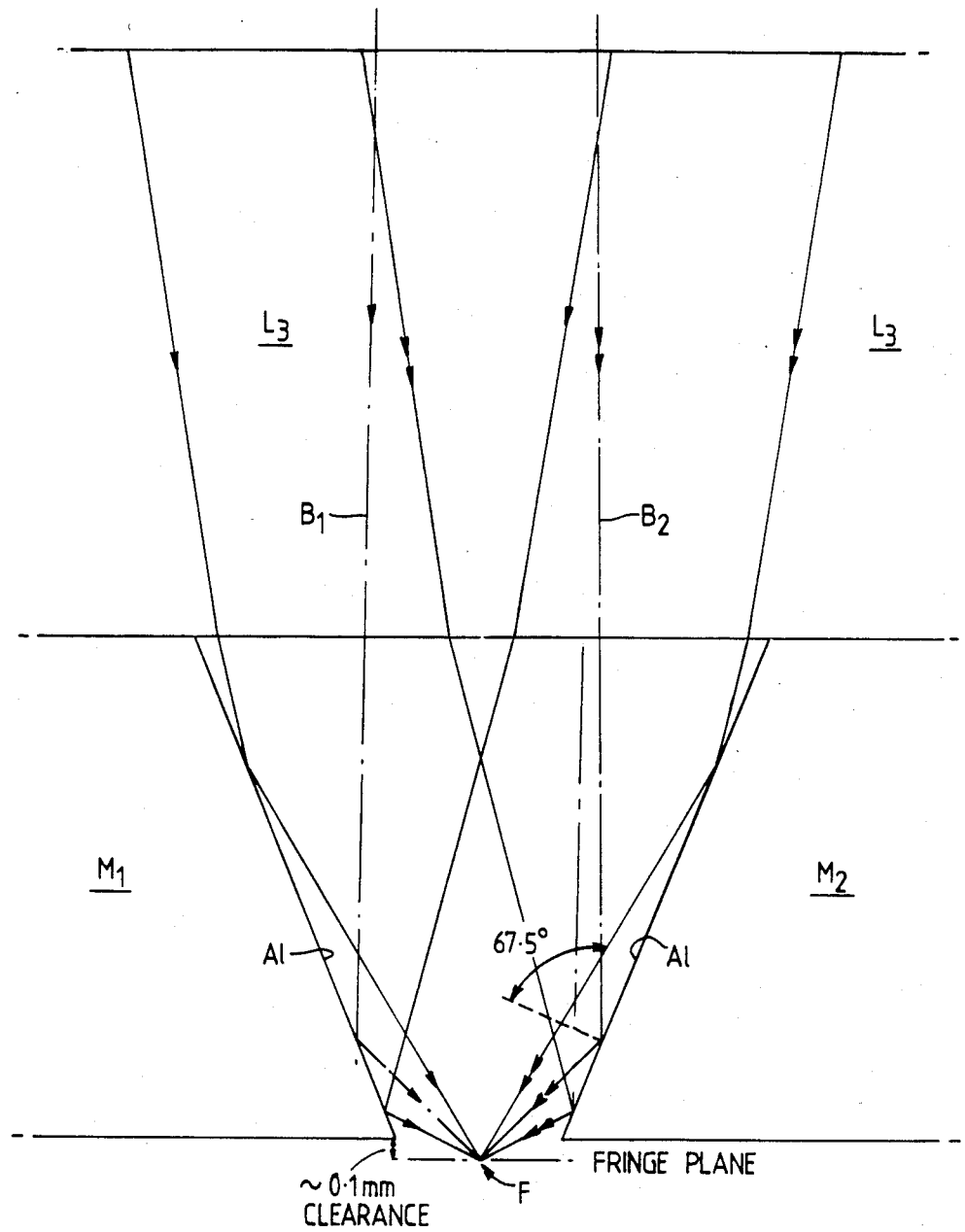

The invention will be described further with reference to the accompanying drawings, in which:

FIG. 1 illustrates schematically an optical system in accordance with the present invention; and FIG. 2 is an enlarged ray diagram illustrating the operation of part of the optical system of FIG. 1.

Referring now to the drawings, a laser (not shown) generates a beam B which is focussed by a first converging lens $L_1$ of focal length 45 mm to a beam waist at a pinhole A which is 20-25 microns in diameter. A prism R is positioned between the lens $L_1$ and the pinhole A in the manner shown. The pinhole serves to remove stray light from the laser beam but may be omitted if the laser used is of sufficiently high quality. In any event, the pinhole or beam waist is the object which is to be imaged by the remainder of the optical system.

A first halfwave plate $P_1$ is positioned between the pinhole A and the beam-splitting arrangement which consists of a Wollaston double image prism W. The halfwave plate $P_1$ serves to rotate the plane of polarisation of the laser beam so that it is at 45° to the splitting plane of the Wollaston prism W (this plane being the plane of the diagram). The Wollaston prism W may be formed for example of quartz or of calcite; with the former, the prism angle is 63°, while with the latter it is 6.6°. The specified angle should be accurate to within + or −1.2°. A polariser $P_2$ is set at 45° to the splitting plane in order to select equal intensity components of the same polarisation. A second halfwave plate $P_3$ serves to rotate this common plane of polarisation so as to bring the direction of the electric field vector, E, perpendicular to the plane of the diagram; this ensures maximum contrast in the interference fringes.

A second converging lens or lens system $L_2$, in the form of a microscope objective, for example Olympus DA 10X, focusses the beams with the aid of a mirror system which is illustrated in FIG. 2. The mirror system M is positioned against a transparent plate $L_3$ which is fixed in front of the microscope objective $L_2$; it consists of two flat downwardly tapering bodies $M_1$ and $M_2$ the inward facing walls of which are coated with a highly reflective layer, for example a layer of aluminium. The two beams emerging from the Wollaston prism W and polarising arrangement $P_2$, $P_3$ are indicated in FIG. 2 by their principal rays $B_1$ and $B_2$. After emerging from the microscope objective $L_2$ (not shown in FIG. 2) the two beams $B_1$ and $B_2$ pass through element $L_3$ towards mirror $M_1$ and $M_2$. The angle of incidence of the principal ray of each beam on its respective mirror is 67.5°. Element $L_3$ may be a glass or fused silica disk of convenient size, e.g. 20 mm diameter, which is fixed in front of the microscope objective $L_2$. Mirrors $M_1$ and $M_2$ bring the beams $B_1$ and $B_2$ to a focus at a point F about 0.1 mm below the bottom plane of the mirrors. The angle of intersection of the two beams is 90°. The distance between focus F and the remote surface of element $L_3$ is about 4 mm in this embodiment.

The Wollaston prism W operates by polarisation. The objective $L_2$ receives light from two apparent sources which are at a distance d apart, where $$D = W \times l$$

where W is the doubling angle of the Wollaston prism, typically about 2°, and l is the distance from the Wollaston prism to the pinhole, which will typically be about 200 mm. This separation is adjustable.

The halfwave plates $P_1$ and $P_3$ and the polariser $P_2$ are necessary to ensure that the virtual light sources are of equal intensity and that the interfering beams have the correct polarisation when they reach their focal point.

In use, a photoresist which is to be exposed is positioned in the plane of the focal point F. Typically, the resist is coated onto a flat circular disk substrate and the interference pattern is generated close to the outer perimeter of the disk; the disk is then rotated and translated radially during exposure so that a spiral track of fringes is produced. The disk carrying the photoresist will be located precisely with respect to the optical system in order to maintain the interferometer at a fixed height above the surface of the photoresist. This can be achieved by known techniques, for example by using air bearing or electronic servo techniques.

We claim:

1. An interferometer which comprises: (1) a single, coherent light source; (2) a first converging lens positioned on the optical axis of said coherent light source; (3) means including a beam-splitting arrangement positioned on said optical axis and spaced from said first converging lens by a distance greater than the focal length of said lens, for providing two laterally spaced beams, (4) a second converging lens positioned on said optical axis to receive and to focus the two beams emanating from the beam-splitting arrangement; and (5) means including a mirror arrangement positioned so that the beams focused by said second converging lens impinge on the mirror arrangement, for reflecting said beams to intersect at a focal point with a large angle between the principal rays of the two beams.

2. An interferometer as claimed in claim 1, wherein the beam-splitting arrangement comprises a Wollaston double image prism and a polarising arrangement.

3. An interferometer as claimed in claim 2, wherein said coherent light source is a laser generating light of wavelength of about 450 nm or less.

4. An interferometer as claimed in claim 2, wherein said first converging lens has a focal length of about 40–50 mm and said second converging lens is a microscope objective lens.

5. An interferometer as claimed in claim 2, wherein the optical elements are arranged so that said reflected beams are brought to intersect at an angle of at least 45 degrees.

6. An interferometer as claimed in claim 1, wherein said coherent light source is a laser generating light of wavelength of about 450 nm or less.

7. An interferometer as claimed in claim 3, wherein said first converging lens has a focal length of about 40–50 mm and said second converging lens is a microscope objective lens.

8. An interferometer as claimed in claim 3, wherein the optical elements are arranged so that said reflected beams are brought to intersect at an angle of at least 45 degrees.

9. An interferometer as claimed in claim 1, wherein said first converging lens has a focal length of about 40–50 mm and said second converging lens is a microscope objective lens.

10. An interferometer as claimed in claim 1, wherein the optical elements are arranged so that said reflected beams are brought to intersect at an angle of at least 45 degrees.

11. An interferometer as claimed in claim 5, wherein said angle of intersection is 90 degrees or greater.

12. An interferometer which comprises:

a single, coherent light source;

a first converging lens positioned on the optical axis of said coherent light sources;

means including a beam-splitting arrangement positioned on said optical axis and spaced from said first converging lens by a distance greater than the focal length of said lens for splitting the light beam into two laterally spaced beams;

a second converging lens positioned on said optical axis to receive and to focus the two beams emanating in use from the beam-splitting arrangement;

means including a mirror arrangement positioned so that the beams focused by said second converging lens impinge on the mirror arrangement for reflecting said beams to intersect at a focal point with a large angle between the principal rays of the two beams;

said beam-splitting arrangement comprising a Wollaston double image prism and a polarizing arrangement;

said coherent light source constituting a laser generating light of wavelength of about 450 nm or less;

said first converging lens having a focal length of about 40–50 mm and said second converging lens being a microscope objective lens; and said interferometer including means for arranging the optical elements so that said reflected beams are brought to intersect at an angle of at least 45 degrees.

* * * * *